(Model.)
H. C. & S. L. NEER.
Spring Seat for Vehicles.
No. 235,276. Patented Dec. 7, 1880.
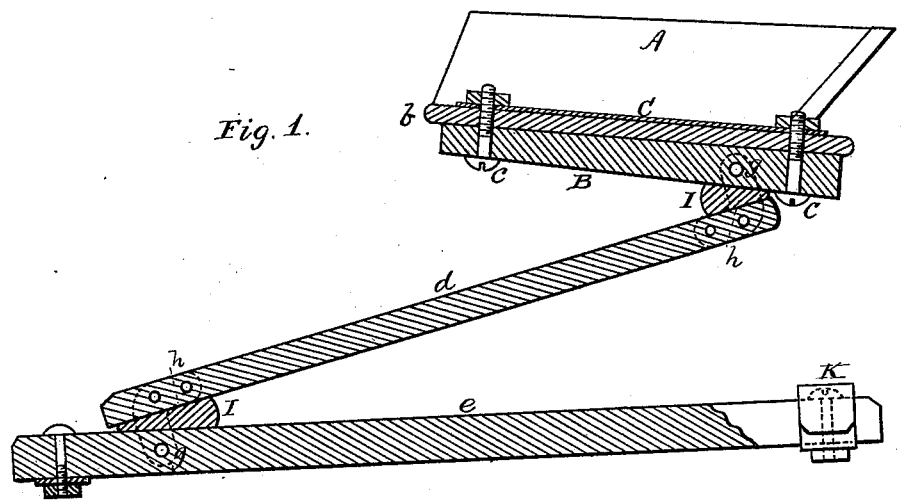
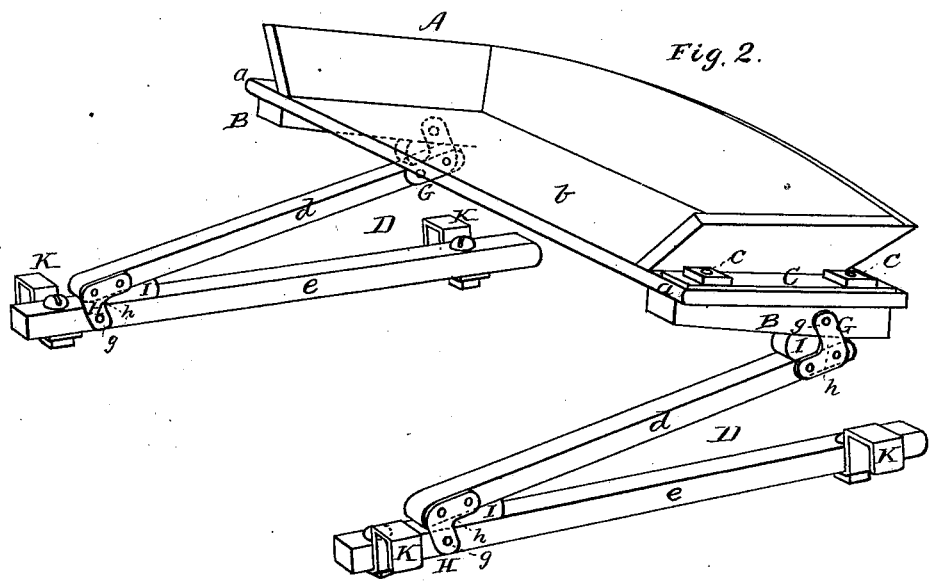
WITNESSES
Villette Anderson.
Philip C. Masi.
INVENTOR
H. C. Neer.
S. L. Neer.
by E. W. Anderson
their ATTORNEY
N. PETERS, PHOTO-LITHOGRAPHER, WASHINGTON, D C.

UNITED STATES PATENT OFFICE.

HENRY C. NEER AND SAMUEL L. NEER, OF BRECKENRIDGE, ILLINOIS.

SPRING-SEAT FOR VEHICLES.

SPECIFICATION forming part of Letters Patent No. 235,276, dated December 7, 1880.

Application filed October 23, 1880. (Model.)

*To all whom it may concern:*

Be it known that we, HENRY C. NEER and SAMUEL L. NEER, of Breckenridge, in the county of Sangamon and State of Illinois, have invented a new and valuable Improvement in Spring-Seats for Vehicles; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a vertical transverse section of this invention. Fig. 2 is a perspective view of the same.

This invention relates to spring-seats for vehicles.

The invention consists in the construction hereinafter specified.

In the annexed drawings, A is a vehicle-seat, fastened at the edges $a$ of its bottom $b$ to cross-bars B by bolts $c$ and plates C.

D D are the seat-risers, consisting of straight arms $d$ and arms $e$ at an angle thereto. The arms $d$ are fastened at top and bottom to bars B, and arms $e$ by cheek-pieces G and H, said pieces being firmly fastened to arms $d$, and connected, by a pivotal bolt, $g$, to arms $e$ and bars B. Between said cheek-pieces and bars $d$ and bars B and arms $e$ are formed pockets $h$, in which are seated pieces of rubber I.

Attached to the ends of arms $e$ are hangers K. By means of these hangers the device is hung upon the edges of the side-boards of a vehicle, and the occupant takes his place upon seat A.

The pieces of rubber I in pockets $h$ serve as springs, and by their resiliency prevent shocks in going over rough ground.

What we claim is—

The combination of seat A, cross-bars B B, bolts $c$, plates C, seat-risers D D, consisting of arms $e$ $e$, having hangers K, and arms $d$ $d$ at an angle to arms $e$ $e$, cheek-pieces G H, fastened to arms $d$ $d$ and pivoted to arms $e$ $e$, and cross-bars B B, and forming pockets $h$, and rubber pieces I seated in said pockets, the whole forming a spring-seat for vehicles.

In testimony that we claim the above we have hereunto subscribed our names in the presence of two witnesses.

HENRY C. NEER.
SAMUEL L. NEER.

Witnesses:
F. W. HALLEY,
A. W. SMITH.